United States Patent Office 3,288,540
Patented Nov. 29, 1966

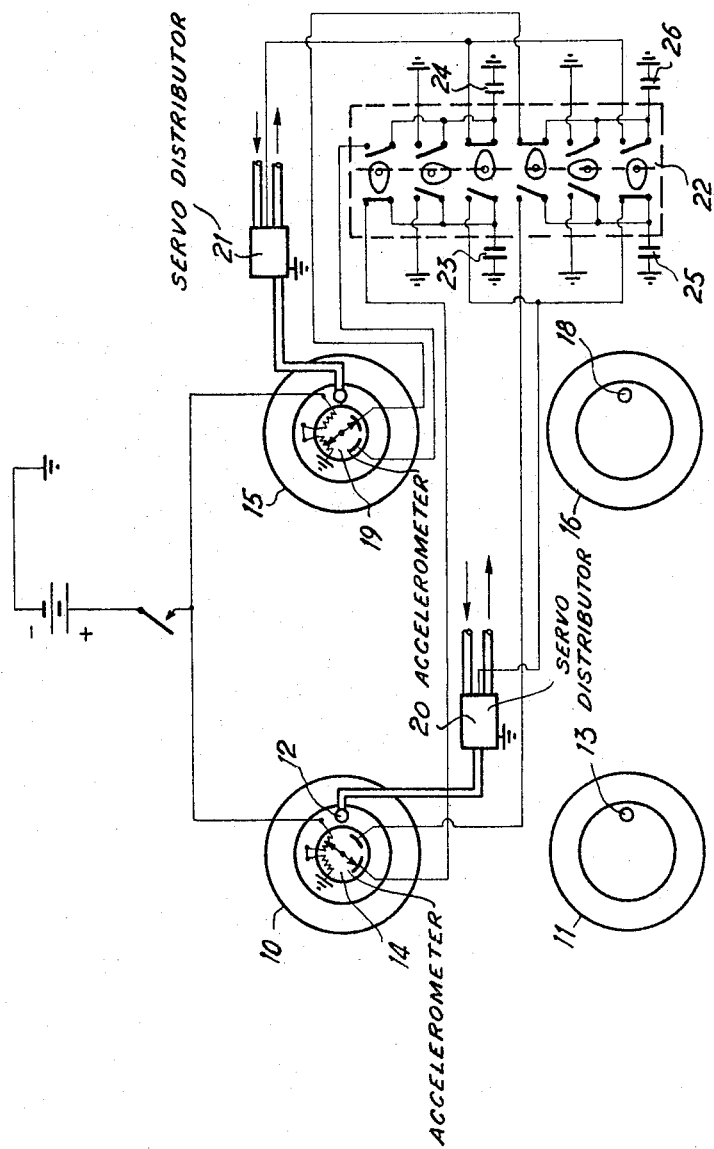

3,288,540
DEVICE FOR CONTROLLING THE HYDRAULIC BRAKING OF THE WHEELS OF A VEHICLE
René Lucien, Neuilly-sur-Seine, France, assignor to Societe Recherches Etudes Production R.E.P., S.a.r.l., Paris, France
Filed Oct. 27, 1964, Ser. No. 408,458
Claims priority, application France, Oct. 30, 1963, 952,319, Patent 84,854
2 Claims. (Cl. 303—21)

The present invention relates to the control of the hydraulic braking of a wheeled vehicle.

For vehicles on wheels, devices are known which tend to prevent locking of the wheels. In these devices, a brake-releasing signal is sent to the braking installation when the angular deceleration of the wheel exceeds a predetermined value. The choice of this value presents a difficult problem; if it is too low, the braking distance is increased to an unacceptable extent; if it is too high, there is a risk of causing locking when the running conditions are not those which were expected. In fact, when it is desired to retain sufficient braking capability for the vehicle, the control device only begins to act when the tire has begun to skid. Account must also be taken of the time of response of the control device.

By reason of these difficulties, the known devices are frequently only left operative if particular circumstances are expected which greatly aggravate the risk of locking the wheels, so that if the actual conditions are not those which have been expected and which have led to the device being made inoperative, locking of the wheels takes place.

It is an object of the invention to provide a device by which the wheels of a vehicle are braked under the optimum conditions of efficiency and safety.

It is a particular object of the invention to provide a device, in accordance with which skidding of the tire on the ground or the like is prevented in a sure manner, in spite of the variations of surface condition. It is also an object of the invention to provide a device for controlling the braking of a wheeled vehicle which is simple in construction and adapts itself easily to existing braking installations.

It is still a further object of the invention to provide a system which can be readily adjusted to the state of the ground and also to the variable conditions which exist during the braking of certain vehicles, for example of aircraft during the course of landing.

According to the invention, the possibilities of braking, that is to say of deceleration of a vehicle on wheels are indicated at instants which can be as close together as may be necessary, by the measurement of the acceleration of the wheels of the vehicle, the running-up to speed of a wheel fitted with a pneumatic tire being a function, inter alia, of the coefficient of friction between the tire and the ground and therefore of the state of the ground, and the results of the measurement are utilized in order to put the braking installation into a condition such that the braking pressure cannot reach a value beyond which a wheel would become locked.

The invention thus puts the installation at every instant into the condition which is most favorable to braking, making it possible to effect the desired braking with the required intensity, at the same time giving the certainty that locking of the wheels will not take place at any moment. It thus enables the best possible use of the characteristics of an existing braking installation and also the best advantage to be taken of the state of the ground on which the vehicle is travelling.

In the case where rapid braking is desired, it permits stopping of the vehicle to be effected within the minimum possible distance and without risk of accidents.

In consequence, the invention relates to a braking-control device, the basic idea of which is as follows: the wheel of the aircraft or of the vehicle is subjected to periodic braking and braking-release operations; the acceleration of the wheel during the brake-release periods is measured and a braking pressure proportional to this acceleration is sent to the brake. The invention utilizes the fact that the running-up to speed of a wheel fitted with a pneumatic tire is a function, inter alia, of the coefficient of friction between the tire and the ground, and therefore of the state of the ground.

More precisely, the invention is directed to a form of construction in which the braking pressure is modulated about a mean value, which may furthermore be adjustable, the maximum value of braking without locking being determined from the acceleration or reduction of deceleration to which the wheel is subjected during a period of reduction of the braking pressure.

The modulation of the braking pressure is chosen as a function of the desired result. This modulation may be sinusoidal or alternatively it may follow a form similar to a sine wave.

It is provided in this respect that the slopes of the rising portions of the sinusoidal wave vary in a different manner from those of the falling portions. The modulation may also be rectangular.

The invention provides for an automatic variation of the depth of modulation, this being for the purpose of adapting the system to the various conditions of variation of the coefficient of friction with the ground of the wheel which is usually fitted with a pneumatic tire, a relatively deep modulation being preferred when it is to be assumed that ground may be encountered having very varied surface conditions from the point of view of coefficient of friction.

For a ground surface the state of which is fairly uniform, the depth of modulation can be kept much smaller.

The invention is directed to a preferred form of construction in which the reduction of the amplitude of the modulation is obtained automatically from a deceleration detector. In this way, the best efficiency can be obtained for a given ground surface.

The acceleration or reduction of deceleration introduced by the reduction of braking pressure corresponding to a downward sloping portion of the curve representing the intensity of braking is determined by any known means, for example by an inertia mass coaxial with the wheel, freely mounted and coupled to the wheel by elastic means, acceleration then being indicated by an angular displacement between the inertia mass and the wheel.

The acceleration is preferably measured in the form of an electric voltage by means of potentiometer devices, and the said voltage is applied to a servo-distributor of the braking fluid so as to limit the maximum pressure at which the braking fluid is admitted to the members intended for braking the wheel.

In consequence, the device according to the invention comprises amongst others, means employed to reduce to a range which is as small as possible, the variations of pressure sent to the brake, due to the alternate braking and brake-release actions to which the wheel is subjected.

The invention will be described by considering its application to an aircraft provided with a bogey type under-carriage, but it is obvious that this application is given by way of example only and that the invention is applicable to any wheeled vehicle.

The invention will now be described with reference to the single figure of the accompanying drawing, given by way of non-limitative example, which diagrammatically shows a braking controller. In this case, in order to attenuate the possible vibrations transmitted to the undercarriage, the following device may be utilized, which comprises essentially:

Two front wheels 10 and 11 provided with pneumatic tires, each equipped with a hydraulic brake 12 and 13; the wheel 10 is equipped with an accelerometer 14;

Two rear wheels 15 and 16 provided with pneumatic tires, each equipped with a hydraulic brake 17 and 18; the wheel 15 is fitted with an accelerometer 19;

Two servo-distributors 20 and 21, each supplying respectively the two front brakes 12 and 13 and the rear brakes 17 and 18;

A switch unit 22 intended to obtain the sequences of charge, discharge and erasure of the memories, and constituted by a plurality of switches, for example as shown, switches operated by cams in a sequential manner;

A memory group constituted by four electric resistance-capacity circuits 23, 24, 25 and 26.

The operation of this device is as follows:

The two front and rear wheel trains are braked and released with a displacement one with respect to the other of the order of one-half cycle; that is to say when the two front wheels are braked, which creates a bending towards the rear on the under-carriage, the brakes of the two rear wheels are released, which tends to bring the under-carriage towards the front, the two effects compensating and cancelling each other. Each set of wheels, front or rear, is braked following the principle summarized as follows: when the operator gives a braking impulse, there is produced a deceleration of the set of wheels considered. In the following phase, this set is released and the two wheels are run-up proportionally to the coefficient of friction between the tire and the ground. The accelerometer 14 or 19, mounted on one of the two wheels, measures the acceleration resulting from the running-up and transmits this information through the intermediary of the switch unit 22 intended to make the sequences, to a memory 23 or 24.

In the following phase, this memory 23 or 24 restores this information to the servo-distributor 20 or 21, which sends into the brake a pressure proportional to the coefficient of friction between tire and ground which has previously been measured. This braking pressure causes a deceleration of the set of wheels. This deceleration is measured by the accelerometer 14 or 19 which sends its information, through the intermediary of the switch unit 22, to a second memory 25 or 26, which becomes charged in a manner inversely proportional to the signal received.

In the next following phase, the memory 23 or 24, having transmitted its information, is cut-off and therefore the two wheels are run-up to speed. This running-up is braked by the discharge of the memory 25 or 26, into the servo-distributor 20 or 21, so as to reduce the amplitude of pulsation of the braking pressure. At the same time, the memory 23 or 24 is erased and it receives the new acceleration information transmitted by the accelerometer 14 or 19 during the running-up of the wheel. The memory 25 or 26, having transmitted its information, is cut-off in its turn and the memory 23 or 24 discharges, causing the braking of the two wheels. During this time, the memory 25 or 26 is erased and it receives the new deceleration information transmitted by the accelerometer 14 or 19. The cycle is thus repeated during the entire period of braking.

This device can also be produced by having an accelerometer 14 or 19 and a servo-distributor 20 or 21 on each wheel 10 and 11 or 15 and 16, which makes it necessary to have one group of memories 23–24 and 25–26 per wheel. In this case, the switch unit 22 establishes the sequences as before, that is to say the front wheels 10 and 11 are braked together while the rear wheels 15 and 16 are released, the difference arising from the fact that each wheel takes into its memory the information of friction between tire and ground itself and that this information is restored to it in its own servo-distributor.

If the whole assembly of wheels of the bogey are considered, it is found that when the front wheels are braked, the rear wheels are released; this displacement of the order of one-half cycle is obtained by the switch unit which de-phases the sequences of the front set and the rear set. This de-phasing can be effected mechanically, for example with a cam-shaft (shown in dotted lines), the cams controlling the sequences of each set being displaced by about 180°.

This de-phasing may also be effected by an electric relay system or by an electronic balance system.

What I claim is:

1. A system for controlling the hydraulic braking of a wheeled vehicle, comprising means for periodically varying the braking and the release of each wheel, for measuring the acceleration of one wheel during the release and for controlling in dependence on this measurement the value of the following braking, for measuring the deceleration of one wheel during the braking and for controlling in dependence on this measurement the value of the following release, said means comprising a switch unit constituted by a plurality of cam switches, an accelerometer on one of the front wheels, an accelerometer on one of the rear wheels, a servo-distributor for supplying pressure fluid to the brakes of the front wheel, a servo-distributor for supplying pressure fluid to the brakes of the rear wheels, and a group of four memories constituted by four resistance-capacity circuits, said switch unit being connected to said servo-distributors for applying the front brakes and releasing the rear brakes and vice versa, two of the memories controlled by said switch unit recording during the brake release the measurements supplied respectively by the accelerometers and sending during the braking said measurements respectively to the servo-distributors, the two other memories controlled by said switch unit recording during the braking the measurements supplied respectively by the accelerometers and sending during the brake release these measurements respectively to the servo-distributors.

2. A system for controlling the hydraullic braking of a wheeled vehicle, comprising means for periodically varying the braking and release of each wheel, for measuring the acceleration of each wheel during the release and for controlling in dependence on said measurement the value of the following braking, for measuring the deceleration of each wheel during the braking and for controlling in dependence on said measurement the value of the following brake release said means comprising a switch unit constituted by a plurality of cam switches, and for each wheel an accelerometer, a servo-distributor for supplying pressure fluid to its respective brake, and a group of two memories constituted by two resistance-capacity circuits, said switch unit being connected to said servo-distributors for alternately braking the front wheels and releasing the rear wheels and vice versa, one of the memories of each wheel under the control of said switch unit recording during the brake release the measurement supplied by the accelerometer of such wheel and sending said measurement during braking to the servo-distributor of said wheel, the other memory under the control of said switch unit recording during the braking the measurement supplied by the accelerometer and sending said measurement during the release to the servo-distributor.

References Cited by the Examiner

UNITED STATES PATENTS

| | | | |
|---|---|---|---|
| 2,184,568 | 12/1939 | Stanffer | 303—21 |
| 2,249,868 | 7/1941 | Sorensen | 303—21 |

EUGENE G. BOTZ, *Primary Examiner.*